US009175727B2

(12) United States Patent
Kreisig et al.

(10) Patent No.: US 9,175,727 B2
(45) Date of Patent: Nov. 3, 2015

(54) BEARING BLOCK

(75) Inventors: Michael Kreisig, Stuttgart (DE); Falk Schneider, Korntal-Muenchingen (DE); Stefan Steichele, Gerlingen (DE); Justus Himstedt, Stuttgart (DE); Thomas Flender, Eberdingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/593,196

(22) Filed: Aug. 23, 2012

(65) Prior Publication Data

US 2013/0055982 A1    Mar. 7, 2013

(30) Foreign Application Priority Data

Aug. 24, 2011  (DE) .................. 10 2011 081 484

(51) Int. Cl.
| | |
|---|---|
| *F02B 67/06* | (2006.01) |
| *F01L 1/34* | (2006.01) |
| *F02F 7/00* | (2006.01) |
| *F02D 17/00* | (2006.01) |
| *F01M 1/06* | (2006.01) |
| *F16C 35/04* | (2006.01) |
| *F01L 1/053* | (2006.01) |
| *F01L 1/047* | (2006.01) |
| *F16C 27/06* | (2006.01) |

(52) U.S. Cl.
CPC ............... *F16C 35/047* (2013.01); *F01L 1/053* (2013.01); *F01L 2001/0476* (2013.01); *F01L 2101/00* (2013.01); *F01L 2810/03* (2013.01); *F02B 67/06* (2013.01); *F02F 7/0053* (2013.01); *F16C 27/06* (2013.01); *F16C 2360/18* (2013.01)

(58) Field of Classification Search
CPC ........... F01L 1/3442; F01L 1/34; F01L 1/022; F01L 1/00; F01L 1/02; F02F 7/0053; F02F 7/0007; F02B 67/06; F02B 75/22; F02B 67/04; F02D 17/04
USPC ........................................ 123/198 R, 198 DA
See application file for complete search history.

(56) References Cited

U.S. PATENT DOCUMENTS

| | | | | | |
|---|---|---|---|---|---|
| 4,105,265 | A | * | 8/1978 | Stahlecker | .................... 384/536 |
| 4,338,758 | A | * | 7/1982 | Hagbjer | ....................... 52/745.2 |
| 4,610,229 | A | * | 9/1986 | Wissmann et al. | ....... 123/195 R |
| 4,973,172 | A | | 11/1990 | Nisley et al. | |
| 5,712,038 | A | * | 1/1998 | Yamazaki et al. | .......... 428/411.1 |
| 5,887,557 | A | * | 3/1999 | Battlogg | ..................... 123/90.17 |
| 7,600,502 | B2 | * | 10/2009 | Welzmueller et al. | ......... 123/470 |
| 7,799,840 | B2 | * | 9/2010 | Wheeler et al. | .................. 521/83 |
| 8,539,860 | B2 | * | 9/2013 | Waseda | ........................... 74/595 |

(Continued)

FOREIGN PATENT DOCUMENTS

| | | |
|---|---|---|
| DE | 849 046 C | 9/1952 |
| DE | 10 61 565 B | 7/1959 |

(Continued)

OTHER PUBLICATIONS

English abstract for DE-10319386.
English abstract for DE-202005005999.
English abstract for EP-1956222.

*Primary Examiner* — Lindsay Low
*Assistant Examiner* — Syed O Hasan
(74) *Attorney, Agent, or Firm* — Fishman Stewart Yamaguchi PLLC

(57) ABSTRACT

A bearing block may support a camshaft on a cylinder head of an internal combustion engine. The bearing block is formed in one-piece and is provided with an annular closed bearing eye for the camshaft. Thus, the bearing block may be made smaller and thus lighter.

18 Claims, 2 Drawing Sheets

(56) References Cited

U.S. PATENT DOCUMENTS

| | | |
|---|---|---|
| 2003/0154951 A1 | 8/2003 | Nakamura et al. |
| 2007/0221159 A1* | 9/2007 | Tullis et al. ............... 123/195 R |
| 2008/0092691 A1* | 4/2008 | Wittek et al. ............... 74/579 E |
| 2009/0165737 A1* | 7/2009 | Kreisig et al. ............... 123/90.6 |
| 2010/0105488 A1* | 4/2010 | Wormsbaecher et al. .... 464/143 |
| 2011/0139101 A1* | 6/2011 | Dietz ........................ 123/90.15 |

FOREIGN PATENT DOCUMENTS

| | | | |
|---|---|---|---|
| DE | 103 19 386 A1 | 12/2004 | |
| DE | 603 00 487 T2 | 9/2005 | |
| DE | 20 2005 005 999 U1 | 8/2006 | |
| DE | 102005028332 * | 1/2007 | .............. F02B 77/13 |
| DE | 202006018359 U1 | 2/2007 | |
| EP | 1956222 A1 | 8/2008 | |

* cited by examiner

BEARING BLOCK

CROSS-REFERENCE TO RELATED APPLICATIONS

This application claims priority to German Patent Application No. 10 2011 081 484.1, filed on Aug. 24, 2011, the contents of which are hereby incorporated by reference in their entirety.

The present invention relates to a bearing block for supporting a camshaft on a cylinder head of an internal combustion engine according to the generic term of the Claim 1.

BACKGROUND

In internal combustion engines camshafts are usually used for controlling the inlet and outlet valves and supported on bearing blocks on a cylinder head of the internal combustion engine. Due to increasingly strict emission standards for modern internal combustion engines, effort is made especially in the reduction of weight, space and thus also fuel consumption. Reduction of fuel consumption in vehicle internal combustion engines can be realized in particular by reducing the weight of the vehicle; the internal combustion engine has substantial savings potential due to its high metal content. In particular for supporting the camshaft, massive and thus comparably heavy bearing blocks were used to date. Using lighter bearing blocks would thus offer a possibility to reduce weight.

SUMMARY

The present invention thus relates to the problem to specify an improved or at least an alternative embodiment of a generic bearing block particularly characterised by light weight.

According to the invention, this problem is solved by the object of the independent Claim 1. Advantageous embodiments are object of the dependent claims.

The present invention is therefore based on the general idea of forming a one-piece bearing block in contrast to the previous two-piece blocks and additionally providing it with an annularly closed bearing eye for the camshaft.

Due to the formation of the bearing block in one piece, it has a clearly reduced weight compared to a two-piece embodiment, in particular due to the reduced wall thickness. At the same time, the stress on the bearing block according to the invention can be dimensioned with appropriate programs like Finite Element programs, for example, so that only the areas where loads actually occur are provided with more material, whereas the less loaded areas are provided with drastically reduced material. In a particularly weight-optimized form, the bearing block according to the invention is formed like a bracket and may in this embodiment only feature a fraction of the weight of a previous, massive bearing block.

In an advantageous further development of the solution according to the invention, a roller bearing is provided with an external ring, wherein the external ring is rigidly and particularly thermally connected with the bearing block, or forms an integral component of the bearing block. The roller bearing can thus be provided with an external and an internal ring, between which rolling elements roll, or only one external ring wherein between the latter and the camshaft the rolling elements roll. In the last-mentioned case, the external ring of the bearing can be an integral component of the bearing block and the internal ring can be formed by the camshaft. In this embodiment already, one part of the bearing which bears the camshaft in the bearing block can be produced together with the bearing block so that a completely separate roller bearing, connected with the thus-combined additional weight, can be saved.

In another advantageous embodiment of the solution according to the invention the bearing block is formed of plastic or metal. In particular, a formation made of plastic might be of great interest due to increasingly robust plastics because modern plastics are increasingly better compatible with the high temperature and chemically aggressive ambient conditions in cylinder heads. The common embodiment made of metal is also applicable, in particular in the form of sheet metal design, which, on the one hand, is stable and on the other hand is weight-optimized.

At least a damping element for vibration damping is appropriately provided on the bearing block. Such a damping element reduces vibration transfer from the camshaft to the cylinder head or vice versa, and thus provides a clearly smoother running of the internal combustion engine. Generally such damping elements were previously completely unknown in bearings of camshafts, so that such damping elements can also be generally applied to common bearing blocks, thus in particular on two- or multi-piece bearing blocks. The at least one damping element can thus be disposed cumulatively or alternatively between the bearing block and the cylinder head, between the internal ring of the bearing and the camshaft and/or on a spot particularly sensitive to vibrations of the bearing block. Such damping elements can for example be supports made of metal sheets or plastic or also absorbers generating counter-vibration and thus counteracting the vibration produced by the internal combustion engine.

The roller bearing is provided appropriately with an external and an internal ring between which rolling elements roll or only one external ring so that the rolling elements roll between it and the camshaft. In particular, in the last case for example needle rollers can be used, which roll on a hardened bearing surface of the camshaft. Due to the missing internal ring, the need for weight and space can again be reduced so that the emission balance can be improved again.

Other important features and advantages of the invention are derived from the dependent claims, the drawings and the associated descriptions of the figures with the help of the drawings.

It is obvious that the above-mentioned and the following still to be mentioned features cannot only be used in the respectively specified combination but also in other combinations or alone, without departing from the scope of the present invention.

Preferred embodiments of the invention are shown in the drawings and are further explained in the following description, wherein the same references refer to identical or similar or functionally identical components.

BRIEF DESCRIPTION OF THE DRAWINGS

Thus shown, respectively schematically.

DETAILED DESCRIPTION

Figure 1:
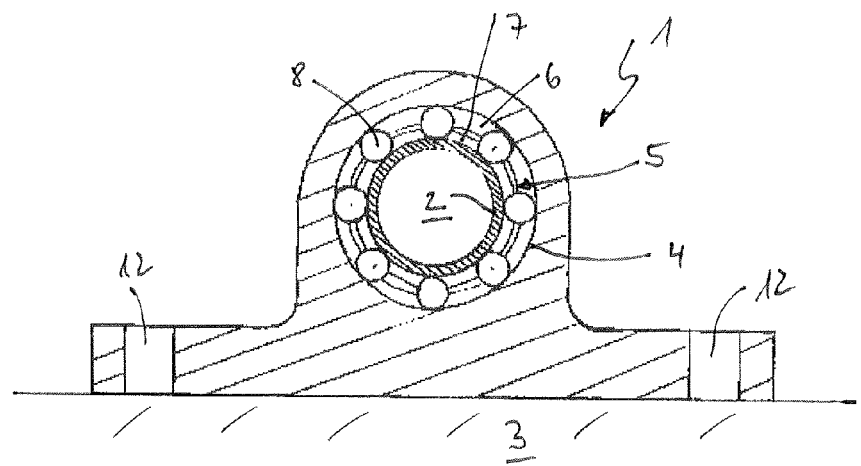
FIG. 1 a cut view through a first possible embodiment of a bearing block according to the invention, FIG. 2 a representation as in FIG. 1, but with an additional damping element, FIG. 3 a cut view through a bearing block according to the invention with a damping element formed in sandwich structure, FIG. 4 a particularly weight-optimized form of the bearing block according to the invention, FIG. 5 a representation as in FIG. 1, but with additionally disposed damping elements.

According to FIG. 1, a bearing block 1 according to the invention for supporting a camshaft 2 on a cylinder head 3 is provided with an annular shaped, closed bearing eye 4 for the camshaft 2. Furthermore, the bearing block 1 according to the invention is formed in one piece. In the bearing eye 4 additionally to a particularly easy-going bearing of the camshaft 2 a roller bearing 5, which can be formed in particular as a ball or needle bearing can be disposed additionally. The roller bearing 5 thus has an external ring 6 as well as an internal ring 7 between which the roller elements 8, for example balls or needles, roll. Alternatively, the roller bearing 5 can also be provided with only an external ring 6, wherein in this case the rolling elements 8 directly roll on an external side of the camshaft 2, which in particular can be especially hardened. In this case it can be omitted completely on the internal ring 7 leading to an additional weight reduction.

Through the one-pieced form of the bearing block 1 according to the invention, it can be produced in a weight-optimized way which is particularly advantageous with respect to $CO_2$ emission balance of a vehicle.

Figure 2:
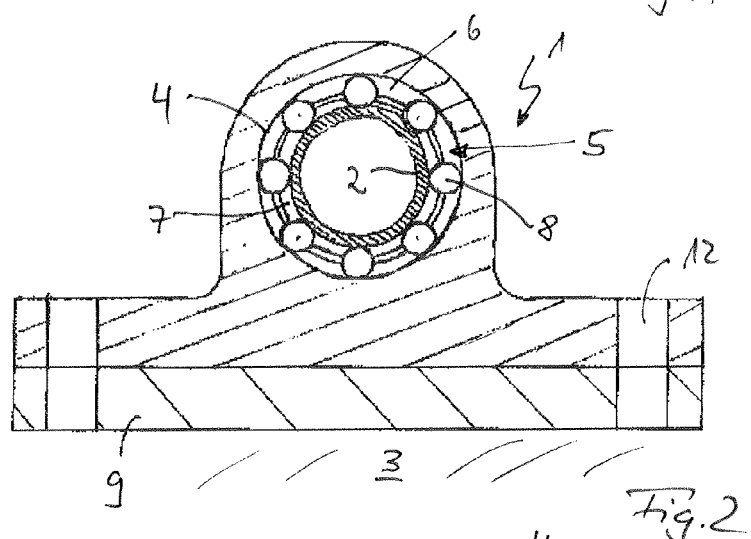
Figure 3:
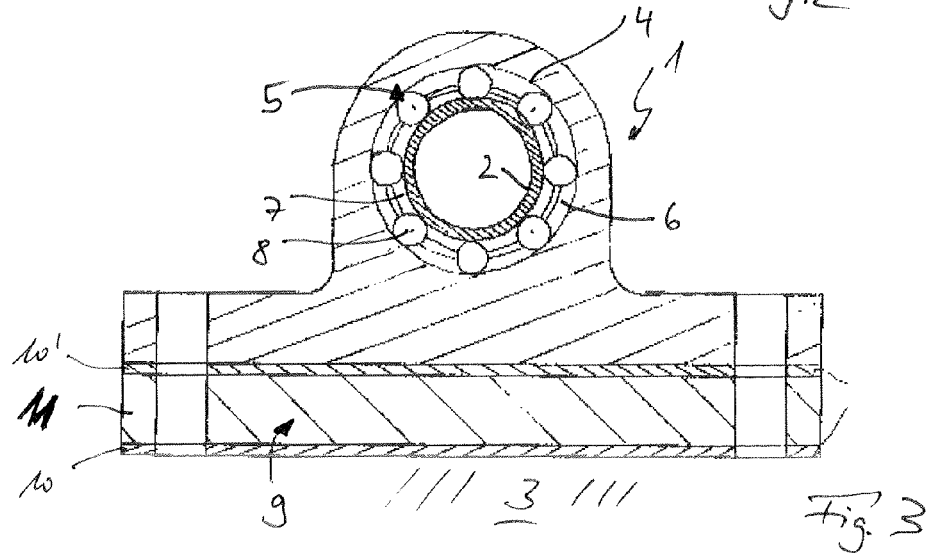
Figure 5:
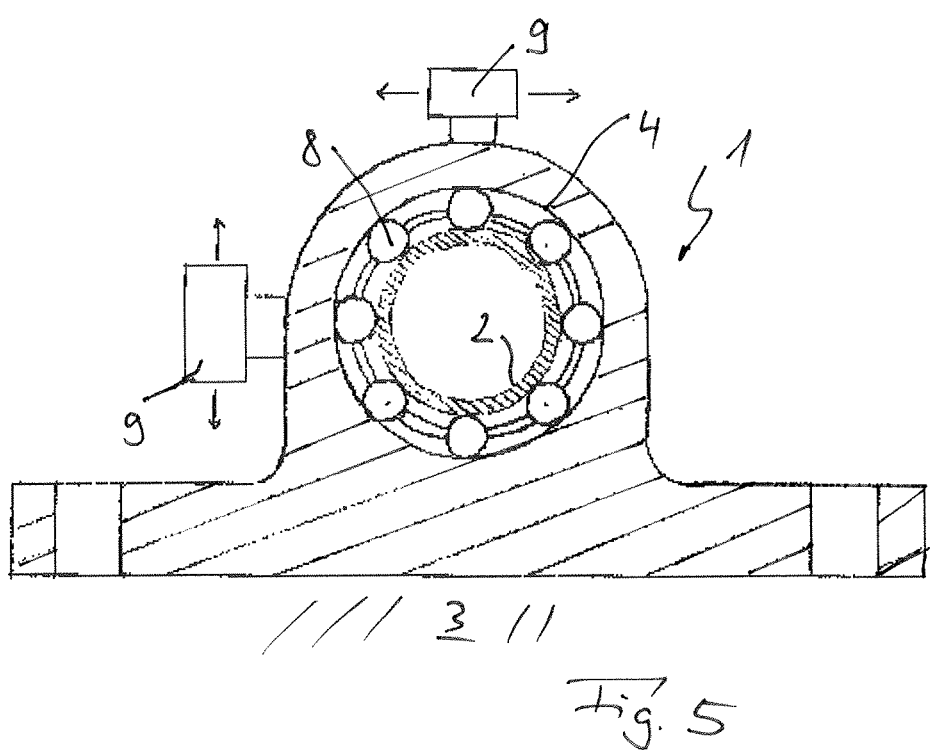

The external ring 6 can be rigidly connected with the bearing block 1, in particular thermally inserted or form an integral component of the bearing block 1, so that a separate external ring 6 and its corresponding weight can also be omitted. In order to, at least, additionally reduce vibration transfer from the cylinder head 3 to the camshaft or vice versa, at least one damping element 9 that is formed according to FIG. 2 can be provided between the bearing block 1 and the cylinder head 3. According to FIG. 3, the damping element 9 has a sandwich structure, with two outer and comparably thin edge layers 10 and 10' an a central, comparably thick damping layer 11. In the embodiment of the bearing block 1 according to FIG. 5, the two damping elements are formed on spots of the bearing block 1 which are particularly sensitive to vibration, for example, in an absorber-like manner. All damping elements 9 thus serve to reduce the vibration inclination and thus increase smooth running of the internal combustion engine.

The, at least, one damping element 9, for example, can be formed of plastic, particularly an elastomer or metal, particularly of a metal sheet or metal foam.

When considering the embodiments of the bearing block 1 according to the invention based on FIGS. 1 to 5, one can see that every bearing block 1 is provided with two fixing holes 12 for inserting screws—not shown—to fix the bearing block 1 to the cylinder head 3. If the damping element 9 is disposed between the bearing block 1 and the cylinder head 3, the damping element 9 also is provided with appropriate fixing holes 12 for inserting the appropriate screws.

Figure 4:
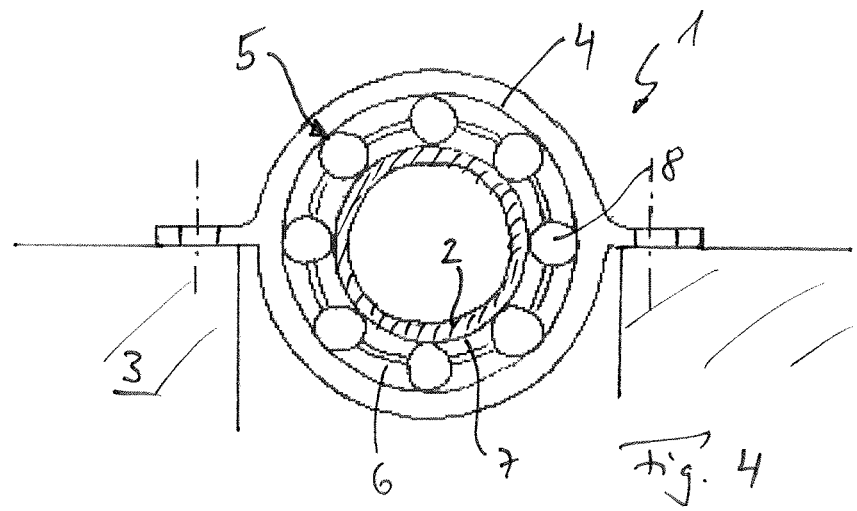

In a particularly weight-optimized form of the bearing block 1 according to the invention, for example, as shown in FIG. 4, a bracket can be formed in this way, wherein metals and plastics can be used provided that they can withstand the aggressive ambient conditions in the cylinder crank cases. In addition to weight optimization with the help of the bearing block 1 according to the invention, it needs much less space, which is also a huge advantage in modern and often narrow engine compartments. Naturally, the damping elements 9 according to the invention are thus not only limited to the embodiment according to the invention of the bearing block 1 in its one-pieced form, but can generally be applied to bearing blocks consisting of several pieces, as known from the state of the art. Also in these bearing blocks, the damping elements 9 according to the invention provide a significantly smoother running and thus significantly enhanced driving comfort.

The invention claimed is:

1. A bearing block for supporting a camshaft on a cylinder head of an internal combustion engine wherein the bearing block is formed in one-piece and is provided with an annular, closed bearing eye for the camshaft; and a damping element arranged at a radially external surface defined by the bearing block and facing towards the cylinder head, the damping element contacting the bearing block on one end and the cylinder head on another end, wherein the damping element defines a sandwich structure including a plurality of layers, and each layer is configured to reduce a vibration transferred between the bearing block and the cylinder head corresponding with the internal combustion engine in a running condition.

2. The bearing block according to claim 1 wherein a roller bearing for supporting the camshaft is disposed in the bearing eye.

3. The bearing block according to claim 2, wherein the roller bearing includes a plurality of rolling elements and at least one radially external ring firmly connected with the bearing block, the at least one external ring being joined thermally with the bearing block, and wherein the plurality of rolling elements directly roll on an external side of the camshaft.

4. The bearing block according to claim 3 wherein the bearing block is provided with two fixing holes for inserting a plurality of screws for fixing the bearing block to the cylinder head.

5. The bearing block according to claim 4 wherein at least one of the bearing block is formed as a bracket and the bearing block is formed of at least one of plastic and metal.

6. The bearing block according to claim 1, wherein the plurality of layers of the damping element are arranged overlaying one another in a direction of the cylinder head and include a central damping layer having a first radial thickness disposed between two outer layers on radially opposite sides of the central damping layer, the two radially outer damping layers respectively having a second radial thickness, and
wherein the first radial thickness is greater than the second radial thickness.

7. The bearing block according to claim 1, wherein the damping element is composed of a plastic.

8. The bearing block according to claim 1, wherein the bearing block defines a radially external surface facing away from the cylinder head, and wherein at least one second damping element is arranged on the external surface of the bearing block in a predetermined position that is sensitive to vibration, the at least one second damping element configured to reduce a vibration corresponding with the internal combustion engine in the running condition.

9. The bearing block according to claim 1, wherein the bearing block is provided with two fixing holes for inserting a plurality of mechanical fasteners for fixing the bearing block to the cylinder head.

10. The bearing block according to claim 9, wherein the damping element includes two fixing holes corresponding to the fixing holes of the bearing block for receiving the plurality of mechanical fasteners.

11. The bearing block according to claim 1, wherein at least one of the damping element and the bearing block is made of at least one of plastic and metal.

12. The bearing block according to claim 1, wherein a roller bearing for supporting the camshaft is disposed in the bearing eye, the roller bearing including a plurality of rolling elements arranged radially between an external ring connected to the bearing block and a radially internal ring, wherein a second damping element is disposed between the internal ring and the camshaft configured to reduce a vibration corresponding with the internal combustion engine in the running condition.

13. The bearing block according to claim 2 wherein at least one of (i) the bearing block is formed as a bracket and (ii) the bearing block is formed of at least one of plastic and metal.

14. The bearing block according to claim 1 further comprising:
the bearing block being provided with two fixing holes for inserting the screws for fixing the bearing block to the cylinder head; and
at least one of (i) the bearing block being formed as a bracket and (ii) that the bearing block is formed of at least one of plastic and metal.

15. The bearing block according to claim 1, wherein the damping element is disposed between the bearing block and the cylinder head, and the damping element has a plurality of fixing holes configured to receive a plurality of mechanical fasteners that attach the bearing block to the cylinder head.

16. The bearing block according to claim 1, wherein a roller bearing is provided with a radially external ring only, wherein rolling elements directly roll on an external side of the camshaft and are disposed between the radially external ring and the camshaft.

17. A bearing block for supporting a camshaft on a cylinder head of an internal combustion engine wherein the bearing block is formed in one-piece and defines a radially external surface facing the cylinder head, wherein the bearing block is provided with an annular, closed bearing eye for the camshaft, and a damping element configured to be secured between the bearing block and the cylinder head, and the damping element defining a sandwich structure including a plurality of layers arranged overlaying one another in a direction of the cylinder head, and each of the plurality of layers is configured to reduce a vibration corresponding with the internal combustion engine in a running condition, and wherein the plurality of layers includes at least a central damping layer and two outer damping layers on radially opposing sides of the central damping layer, and each of said outer damping layers being thinner than said central damping layer, wherein one of the two radially outer damping layers is arranged on the external surface of the bearing block and the other of the two radially outer damping layers is arranged on the cylinder head.

18. An internal combustion engine, comprising: a cylinder head; a bearing block for supporting a camshaft on the cylinder head, the bearing block formed in one-piece and including an annular, closed bearing eye for mounting the camshaft; a damping element arranged between the bearing block and the cylinder head configured to reduce a vibration transferred between the bearing block and the cylinder head corresponding with the internal combustion engine in a running condition, the damping element contacting the bearing block on one end and the cylinder head on another end; and wherein the damping element defines a sandwich structure including a plurality of layers arranged overlying one another in a direction of the cylinder head, each of the plurality of layers configured to reduce the vibration transferred between the bearing block and the cylinder head, wherein the plurality of layers includes at least a central damping layer having a first radial thickness arranged between two outer damping layers having a second radial thickness disposed on radially opposing sides of the central damping layer, and wherein the first thickness is greater than the second thickness.

\* \* \* \* \*